(12) United States Patent
Morimoto et al.

(10) Patent No.: US 9,977,825 B2
(45) Date of Patent: May 22, 2018

(54) DOCUMENT ANALYSIS SYSTEM, DOCUMENT ANALYSIS METHOD, AND DOCUMENT ANALYSIS PROGRAM

(71) Applicant: UBIC, Inc., Tokyo (JP)

(72) Inventors: Masahiro Morimoto, Tokyo (JP); Yoshikatsu Shirai, Tokyo (JP); Hideki Takeda, Tokyo (JP); Kazumi Hasuko, Tokyo (JP); Akiteru Hanatani, Tokyo (JP)

(73) Assignee: UBIC, INC., Tokyo (JP)

( * ) Notice: Subject to any disclaimer, the term of this patent is extended or adjusted under 35 U.S.C. 154(b) by 0 days. days.

(21) Appl. No.: 15/115,905

(22) PCT Filed: Feb. 4, 2014

(86) PCT No.: PCT/JP2014/052582
§ 371 (c)(1),
(2) Date: Aug. 1, 2016

(87) PCT Pub. No.: WO2015/118620
PCT Pub. Date: Aug. 13, 2015

(65) Prior Publication Data
US 2017/0075986 A1    Mar. 16, 2017

(51) Int. Cl.
*G06F 17/30* (2006.01)
*G06Q 10/00* (2012.01)
*G06Q 50/18* (2012.01)

(52) U.S. Cl.
CPC .. *G06F 17/30657* (2013.01); *G06F 17/30011* (2013.01); *G06F 17/30598* (2013.01);
(Continued)

(58) Field of Classification Search
CPC ............... G06F 17/30; G06F 17/30598; G06F 17/30864; G06F 17/30867; G06F 17/30943
See application file for complete search history.

(56) References Cited

U.S. PATENT DOCUMENTS 8,774,550 B2 * 7/2014 Yamada ............... G06K 9/3275
382/266
8,793,277 B2 * 7/2014 Morimoto ............. G06Q 10/10
707/736

(Continued)

FOREIGN PATENT DOCUMENTS

JP    2006-085642 A    3/2006
JP    2008-123423 A    5/2008

(Continued)

OTHER PUBLICATIONS

Pradesh-India, Krishna District-Andhra, and Andhra Pradesh—India. "Analysis of the Fraud E-Mails using Truncated Gaussian Mixture Model and Ontological Application."*

(Continued)

*Primary Examiner* — Nan Hutton
(74) *Attorney, Agent, or Firm* — Lewis Roca Rothgerber Christie LLP

(57) ABSTRACT

Efficiency in monitoring documents is promoted by quantifying the priorities of the documents to be monitored. A document analysis system (1) includes: a score calculation unit (116) that calculates a score indicating strength of linkage between a document included in document information and a classification code indicating the relevance between the document information and a lawsuit or a fraud investigation; and a score report unit (701) that reports the score to a user according to the calculated score.

7 Claims, 10 Drawing Sheets

(52) U.S. Cl.
CPC .. *G06F 17/30696* (2013.01); *G06F 17/30705* (2013.01); *G06Q 10/00* (2013.01); *G06Q 50/18* (2013.01)

(56) References Cited

U.S. PATENT DOCUMENTS

| | | | |
|---|---|---|---|
| 9,419,917 B2* | 8/2016 | Eaton | .................. H04L 47/785 |
| 2009/0070101 A1 | 3/2009 | Masuyama et al. | |
| 2012/0239666 A1 | 9/2012 | Morimoto et al. | |
| 2012/0246185 A1 | 9/2012 | Morimoto et al. | |
| 2012/0290578 A1 | 11/2012 | Morimoto et al. | |

FOREIGN PATENT DOCUMENTS

| | | |
|---|---|---|
| JP | 2011-8584 A | 1/2011 |
| JP | 2011-191829 A | 9/2011 |
| JP | 2011-209930 A | 10/2011 |
| JP | 2011-209931 A | 10/2011 |
| JP | 2012-032859 A | 2/2012 |
| JP | 2013-214152 A | 10/2013 |
| KR | 10-2008-0005208 | 1/2008 |
| WO | WO 2012/129361 A9 | 9/2012 |

OTHER PUBLICATIONS

Volonino, Linda. "Electronic evidence and computer forensics." Communications of the Association for Information Systems 12.1 (2003): 27.*
Srinivasan, A., & Baone, G. (Oct. 2008). Classification Challenges in Email Archiving. In RSCTC (pp. 508-519).*
Office Action dated Jul. 23, 2015 in JP Patent Application No. 20156-004586, just prior to being granted as JP Patent No. 5829768 (and machine translation thereof) (6 pages).
International Search Report PCT/JP2014/052582 dated Mar. 4, 2014.
Machine translation of the ISR (including Written Opinion (Box No. V) of the ISA).
English machine translation of JP2006-085642 A in full text.
English machine translation of JP2011-191829 A in full text.
English machine translation of JP2013-214152 A in full text.
English machine translation of JP2008-123423 A in full text.
Notification of Reason for Refusal issued in KR10-2016-7021270, dated Apr. 4, 2017, 6 pages.
English Translation of Notification of Reason for Refusal issued in KR10-2016-7021270, dated Apr. 4, 2017, 5 pages.

\* cited by examiner

DOCUMENT ANALYSIS SYSTEM, DOCUMENT ANALYSIS METHOD, AND DOCUMENT ANALYSIS PROGRAM

CROSS-REFERENCE TO RELATED APPLICATIONS

The present application is a national phase application of International Application PCT/JP2014/052582, with an international filing date of Feb. 4, 2014, the contents of which are incorporated herein by reference in its entirety for all purposes.

TECHNICAL FIELD

The present invention relates to a document analysis system and the like for analyzing document information recorded in a specified computer or server.

BACKGROUND ART

When a crime or legal dispute related to computers (such as unauthorized access or confidential information leakage) occurs, it is necessary to collect and analyze equipment, data, or digital records which are required for investigations to find out the cause of the crime or legal dispute. Particularly, in a civil lawsuit in the United States, a plaintiff and a defendant of the lawsuit assume responsibility to submit digital information related to the lawsuit as evidence pursuant to the eDiscovery (electronic discovery) system.

On the other hand, with rapid developments and widespread use of IT (Information technology), abundant information is created by using computers in businesses in recent years. Therefore, in the process of preparation for submission of evidentiary materials to a court, mistakes to include even confidential information, which is not related to the relevant lawsuit, in the evidentiary materials tend to easily occur. In order to solve the above-described problem, techniques related to a forensic system for analyzing document information are suggested in PTL 1 to PTL 3 indicated below.

Moreover, PTL 4 discloses a storage and search system for auditing telegram data, wherein the system: guarantees that the telegram data which is an audit target is stored in a format incapable of falsification; and makes it possible to promptly and easily execute processing for searching the telegram data which is the audit target. Furthermore, PTL 5 discloses an e-mail audit system capable of making the audit function without imposing excessive burdens on, for example, an audit practitioner. Furthermore, PTL 6 discloses an e-mail audit apparatus that promotes efficiency of work of an auditor, who audits e-mails, and implements appropriate auditing.

CITATION LIST

Patent Literature

PTL 1: Japanese Patent Application Laid-Open (Kokai) Publication No. 2011-209930 (published on Oct. 20, 2011)
PTL 2: Japanese Patent Application Laid-Open (Kokai) Publication No. 2011-209931 (published on Oct. 20, 2011)
PTL 3: Japanese Patent Application Laid-Open (Kokai) Publication No. 2012-032859 (published on Feb. 16, 2012)
PTL 4: Japanese Patent Application Laid-Open (Kokai) Publication No. 2008-123423 (published on May 29, 2008)
PTL 5: Japanese Patent Application Laid-Open (Kokai) Publication No. 2006-085642 (published on Mar. 30, 2006)
PTL 6: Japanese Patent Application Laid-Open (Kokai) Publication No. 2011-191829 (published on Sep. 29, 2011)

SUMMARY OF INVENTION

Problems to be Solved by the Invention

According to the aforementioned conventional techniques regarding the forensic system, documents to be monitored are extracted by searching the documents using keywords or domains. However, when this method is used, it is possible that the documents to be monitored may not be extracted appropriately.

For example, as a result of insufficient refine search of the keywords, a large amount of documents which are candidate targets to be monitored may be listed. In this case, it becomes necessary for, for example, an auditor to visually check (or review) the documents. Contrarily, as a result of excessive refine search of the keywords, it may be possible that the documents to be monitored might not be included in the search results. This would not be able to successfully satisfy, for example, a request to prevent cartels.

The present invention was devised in light of the above-described problems and it is an object of the invention to provide a document analysis system and the like capable of promoting efficiency in monitoring documents by quantifying the priorities of the documents to be monitored.

Means for Solving the Problems

In order to solve the above-described problems, a document analysis system of the present invention is a document analysis system for acquiring information recorded in a specified computer or server and analyzing document information composed of a plurality of documents included in the acquired information, wherein the document analysis system includes: a score calculation unit that calculates a score indicating strength of linkage between a document included in the document information and a classification code indicating relevance between the document information and a lawsuit or a fraud investigation; and a score report unit that reports the score to a user according to the score calculated by the score calculation unit.

Furthermore, regarding the above-mentioned document analysis system, when the score calculated by the score calculation unit exceeds a specified threshold value, the score report unit may report the score.

Furthermore, regarding the above-mentioned document analysis system, the score report unit may report the score by displaying the score calculated by the score calculation unit in a visually recognizable manner.

Furthermore, the above-mentioned document analysis system may further include a document extracting unit that extracts a document having the score reported by the score report unit from the document information.

Furthermore, regarding the above-mentioned document analysis system, the document extracting unit may extract a keyword and/or text included in the document information, as information related to the lawsuit or the fraud investigation, from the document information.

Furthermore, the above-mentioned document analysis system may further include a word searching unit that searches the plurality of documents for the keyword and/or text.

Furthermore, in order to solve the above-described problems, a document analysis method of the present invention is a document analysis method for acquiring information recorded in a specified computer or server and analyzing document information composed of a plurality of documents included in the acquired information, wherein the document analysis method includes: a score calculation step of calculating a score indicating strength of linkage between a document included in the document information and a classification code indicating relevance between the document information and a lawsuit or a fraud investigation; and a score report step of reporting the score to a user according to the score calculated in the score calculation step.

Furthermore, in order to solve the above-described problems, a document analysis program of the present invention is a document analysis program for acquiring information recorded in a specified computer or server and analyzing document information composed of a plurality of documents included in the acquired information, wherein the document analysis program causes a computer to implement: a score calculation function that calculates a score indicating strength of linkage between a document included in the document information and a classification code indicating relevance between the document information and a lawsuit or a fraud investigation; and a score report function that reports the score to a user according to the score calculated by the score calculation function.

Advantageous Effects of Invention

Since the document analysis system, the document analysis method, and the document analysis program according to the present invention can quantify the priorities of documents to be monitored, they have the advantageous effect capable of promoting efficiency in monitoring the documents.

DESCRIPTION OF EMBODIMENTS

[Configuration of Document Analysis System 1]

Figure 1:
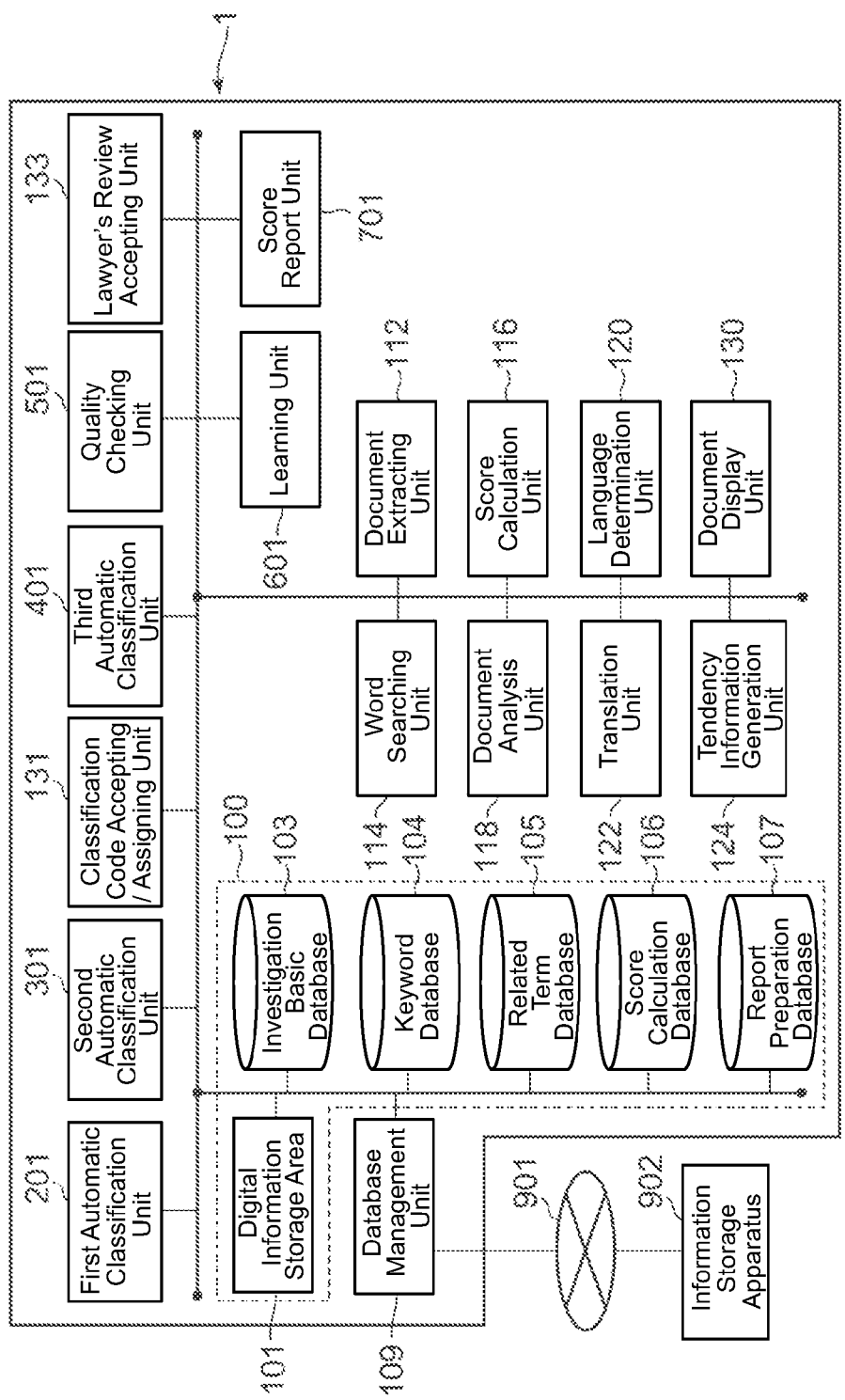
FIG. 1 is a block diagram illustrating a configuration example of a document analysis system according to an embodiment of the present invention.

FIG. 1 is a block diagram illustrating a configuration example of a document analysis system 1 according to an embodiment of the present invention. The document analysis system 1 is a system for acquiring digital information (big data) recorded in a plurality of computers or servers and analyzing document information composed of a plurality of documents included in the acquired digital information.

Referring to FIG. 1, the document analysis system 1 includes a data storage unit 100 (a digital information storage area 101, an investigation basic database 103, a keyword database 104, a related term database 105, a score calculation database 106, and a report preparation database 107), a database management unit 109, a document extracting unit 112, a word searching unit 114, a score calculation unit 116, a score report unit 701, a first automatic classification unit 201, a second automatic classification unit 301, a document display unit 130, a classification code accepting/assigning unit 131, a document analysis unit 118, and a third automatic classification unit 401. Furthermore, the document analysis system 1 may further include a tendency information generation unit 124, a quality checking unit 501, a learning unit 601, a lawyer's review accepting unit 133, a language determination unit 120, and a translation unit 122.

(Data Storage Unit 100)

The data storage unit 100 stores digital information, which is acquired from a plurality of computers or servers, in the digital information storage area 101 in order to use it to analyze a lawsuit or a fraud investigation. Furthermore, the data storage unit 100 includes the investigation basic database 103, the keyword database 104, the related term database 105, the score calculation database 106, and the report preparation database 107. Incidentally, the data storage unit 100 may be a storage medium included inside the document analysis system 1 as illustrated in FIG. 1 or may be an external storage medium connected to the document analysis system 1 so that they can communicate with each other.

The investigation basic database 103 retains, for example, category attributes indicating to which category the relevant data belongs, among categories of lawsuit cases such as antitrust, patent, Foreign Corrupt Practices Act (FCPA), and Products Liability (PL) cases and/or fraud investigations such as information leakage and false billing, company names, persons in charge, custodians, and the structure of an investigation or classification input screen.

The keyword database 104 retains a specified classification code of documents included in the acquired digital information, keywords having a close relationship with the specified classification code, and keyword-corresponding information indicative of a correspondence relationship with the specified classification code and the keywords.

The related term database 105 retains a specified classification code, related terms composed of words of high appearance frequency in documents, to which the specified classification code is assigned, and related-term-corresponding information indicative of a correspondence relationship between the specified classification code and the related terms.

The score calculation database 106 retains weighting of words included in documents in order to calculate a score indicative of strength of linkage between the documents and classification codes.

The report preparation database 107 retains categories, custodians, and a report format determined according to the content of classification work.

(Database Management Unit 109)

The database management unit 109 manages updates of data content of the investigation basic database 103, the keyword database 104, the related term database 105, the score calculation database 106, and the report preparation database 107. The database management unit 109 may be connected to an information storage apparatus 902 via a private exclusive connection line or Internet connection 901. In this case, the database management unit 109 may update the data content of the investigation basic database 103, the keyword database 104, the related term database 105, the score calculation database 106, and the report preparation database 107 on the basis of the content of data stored in the information storage apparatus 902.

(Document Extracting Unit 112)

The document extracting unit 112 acquires the digital information recorded in the plurality of computers or servers and extracts a plurality of documents from the document information included in the acquired digital information. Particularly, the document extracting unit 112 can extract documents having a score, which is reported to a user by the score report unit 701, from the above-mentioned document information.

Furthermore, the document extracting unit 112 can extract keywords and/or texts included in the above-mentioned document information, as information related to a lawsuit or a fraud investigation, from the document information. Incidentally, the document extracting unit 112 can acquire document(s) designated (manually) by the user. In this case, every time one word which is a character string designating the document is accepted (that is, on the fly), the relevant document can be extracted.

(Word Searching Unit 114)

The word searching unit 114 searches the document information for keywords or related terms recorded in the databases. Particularly, the word searching unit 114 can search the plurality of documents for the keywords and/or texts extracted by the document extracting unit 112.

(Score Calculation Unit 116)

The score calculation unit 116 calculates a score indicative of strength of linkage between a document extracted from the document information (the document included in the document information) and the classification code indicating the relevance between the document information and a lawsuit or fraud investigation. A method for calculating the above-mentioned score will be explained later in detail.

The score calculation unit 116 may calculate the above-mentioned score in a time-series manner. Furthermore, when calculating the above-mentioned score in a time-series manner, the score calculation unit 116 may further calculate a moving average of the score and calculate a value of the moving average as the above-mentioned score. Accordingly, the document analysis system 1 can smooth minute changes of the above-mentioned score, so that it can obtain a more robust analysis result.

(Score Report Unit 701)

The score report unit 701 reports the score to the user according to the score calculated by the score calculation unit 116. Under this circumstance, for example, when the above-mentioned score exceeds a specified threshold value, the score report unit 701 may report that score. Incidentally, the above-mentioned specified threshold value can be set arbitrarily according to input from the user.

The score report unit 701 can report the score by displaying the score calculated by the score calculation unit 116 in a visually recognizable manner. Specifically, the score report unit 701 can display the score on, for example, a document display screen 11 (see FIG. 17) by outputting the above-mentioned score to the document display unit 130.

The timing when the score report unit 701 reports the above-mentioned score to the user is arbitrary. For example, the score report unit 701 may report the above-mentioned score every time a specified amount of time has elapsed. Alternatively, the score report unit 701 may report the above-mentioned score on demand (every time it accepts the user's input to request the report). Alternatively, the score report unit 701 may automatically report the score every time a document whose score exceeds the above-mentioned specified threshold value is detected.

The score report unit 701 can output an optimum investigation report according to the investigation type of the lawsuit case or the fraud investigation on the basis of the result of document classification processing. Incidentally, the lawsuit case includes, for example, antitrust, patent, Foreign Corrupt Practices Act (FCPA), and Products Liability (PL) cases. Furthermore, the fraud investigation includes, for example, information leakage and false billing.

(Document Display Unit 130)

The document display unit 130 displays the score, which is reported by the score report unit 701 to the user, on the document display screen 11 (see FIG. 17) in a visually recognizable manner. The document display unit 130 may display the plurality of documents, which are extracted from the document information, on the screen.

Furthermore, when documents having the score reported by the score report unit 701 are extracted by the document extracting unit 112, the document display unit 130 can display the extracted documents on the document display screen 11.

(First Automatic Classification Unit 201)

When the keywords stored in the keyword database 104 are searched by the word searching unit 114 and documents including the keywords are extracted from the document information by the document extracting unit 112, the first automatic classification unit 201 automatically assigns a specified classification code to the extracted documents on the basis of the keyword-corresponding information.

(Second Automatic Classification Unit 301)

When the documents including the related terms stored in the related term database are extracted from the document information and the score is calculated on the basis of an evaluation value of the related terms included in the extracted documents, and the number of the related terms, the second automatic classification unit 301 automatically assigns a specified classification code to a document, whose score exceeds a certain value, from among the documents including the above-mentioned related terms on the basis of the relevant score and the related-term-corresponding information.

(Language Determination Unit 120)

The language determination unit 120 determines the type of a language of the extracted documents.

(Translation Unit 122)

The translation unit 122 translates the extracted documents upon designation by the user or automatically. In this case, it is desirable that a break in the language of the language determination unit should be smaller than one sentence in order to be capable of dealing with a composite language, that is, multiple languages in one sentence. Furthermore, either predictive coding or character coding, or both of them may be used to determine the language. Furthermore, processing for excluding, for example, HTML (Hyper Text Markup Language) headers from translation objects may be executed.

(Classification Code Accepting/Assigning Unit 131)

The classification code accepting/assigning unit 131 accepts a classification code, which is assigned by the user on the basis of the relation with the lawsuit, and assigns that classification code to a plurality of documents which are extracted from the document information and to which no classification code has been assigned.

(Document Analysis Unit 118)

The document analysis unit 118 analyzes the documents to which the classification code is assigned by the classification code accepting/assigning unit 131. Furthermore, in addition to the documents for which the classification code is accepted from the user and to which the classification code is assigned on the basis of the relation with the lawsuit, the document analysis unit 118 may analyze the documents, to which the classification code is automatically assigned by the first automatic classification unit 201 and the second automatic classification unit 301 on the basis of the keywords, the related terms, and the score and integrate the above-mentioned documents for which the classification code is accepted from the user and to which the classification code is assigned, with the above-mentioned documents to which the classification code is automatically assigned, thereby obtaining integrated analysis results. In this case, the third automatic classification unit 401 can automatically assign a classification code on the basis of the integrated analysis results.

Incidentally, regarding procedures to proceed with classification and investigation work, there are diverse procedures such as automatic classification by word search, acceptance of the classification and investigation by the user, automatic classification and investigation using the score, automatic classification and investigation by interposing a learning process, and automatic classification and investigation by interposing quality assurance. The document analysis unit 118 may analyze the plurality of documents, to which the classification code is assigned, together with a process history indicative of in which order and in what kind of combinations the above-mentioned diverse classification and investigation work has proceeded; and the report preparation unit 701 described later may report the analysis results.

(Third Automatic Classification Unit 401)

The third automatic classification unit 401 automatically assigns the classification code to the plurality of document extracted from the document information on the basis of the results of analysis of the documents, to which the classification code is assigned by the classification code accepting/assigning unit 131, by the document analysis unit 118.

(Tendency Information Generation Unit 124)

The tendency information generation unit 124 generates tendency information indicative of the degree of similarity with documents, to which the classification code of each document is assigned, on the basis of the type of words included in each document, the number of appearances, and evaluation values of the words in order for the document analysis unit 118 to analyze the documents.

(Quality Checking Unit 501)

The quality checking unit 501 compares the classification code accepted by the classification code accepting/assigning unit 131 with the classification code assigned by the document analysis unit 118 on the basis of the tendency information and verifies the validity of the classification code accepted by the classification code accepting/assigning unit 131.

(Learning Unit 601)

The learning unit 601 learns weighting of each keyword or related term on the basis of the document classification processing. The learning unit 601 learns the weighting of each keyword or related term according to Expression (2) on the basis of first to fourth processing results (described later). The learning unit 601 may reflect the learning results in the keyword database 104, the related term database 105, or the score calculation database 106.

(Lawyer's Review Accepting Unit 133)

The lawyer's review accepting unit 133 accepts a chief attorney's or chief patent attorney's review in order to improve the quality of the classification investigation and the report and clarify the responsibility for the classification investigation and the report.

DESCRIPTIONS OF TERMS

The "classification code" is an identifier which is used to classify documents and is indicative of the relevance with a lawsuit in order to make it easier to use the documents in the lawsuit. For example, when the document information is used as evidence in the lawsuit, the classification code may be assigned depending on the type of the evidence.

A "document(s)" is data including one or more words. Examples of the "document(s)" may include e-mails, presentation materials, spreadsheet materials, meeting materials, contracts, organization charts, and business plans.

A "word(s)" is a minimum set of character strings having a meaning. For example, a text stating "a document(s) is data including more than one word" includes words "document(s)," "is," "data," "including," "more than," "one," and "word."

A "keyword(s)" is a set of character strings having a certain meaning in a certain language. For example, when selecting keywords from a text "to classify documents," the keywords may be "documents" and "classify." In this embodiment, keywords such as "infringement," "lawsuit," and "Patent Publication No. XX" are selected intensively. Incidentally, the above-mentioned "keywords" may include morphemes.

The "keyword-corresponding information" is information indicating the correspondence relationship between a keyword and a specific classification code. For example, if a classification code "important" indicating important documents in a lawsuit is closely related to a keyword "infringer," the "keyword-corresponding information" may be information for managing the classification code "important" and the keyword "infringer" by linking them together.

A "related term(s)" is a word whose evaluation value is equal to or more than a certain value, among words which appear at high appearance frequency commonly in documents to which a specified classification code is assigned. For example, the appearance frequency may be a proportion of appearances of the related term to a total number of words which appear in one document.

An "evaluation value" is an amount of information which each word exhibits in a certain document. The "evaluation value" may be calculated based on a transmitted information amount. For example, if a specified product name is assigned as a classification code, the aforementioned "related terms" may indicate, for example, the name of a technical field to which the relevant product belongs, a country of sale of the relevant product, and the name(s) of a product(s) similar to the relevant product. Specifically speaking, when a product name of a device for executing image coding processing is assigned as a classification code, examples of the "related terms" include "coding processing," "Japan," and "encoder."

"Related-term-corresponding information" is information indicating the correspondence relationship between a related term and a classification code. For example, when a classification code "Product A" which is a product name related to a lawsuit has a related term "image coding" which is a function of Product A, the "related-term-corresponding information" may be information for managing the classification code "Product A" and the related term "image coding" by linking them together.

A "score" is a value of quantitative evaluation of the strength of linkage with a specified classification code in a certain document. In each embodiment of the present invention, for example, the score is calculated based on words appearing in a document and an evaluation value of each word by using the following expression (1).

[Math. 1]

$$Scr=\Sigma_{i=0}^{N}*(m_i*wgt_i^2)/\Sigma_{i=0}^{N}i*wgt_i^2 \quad (1)$$

Scr: document score
$m_i$: appearance frequency of i-th keyword or related term
$wgt_i^2$: weight of i-th keyword or related term The document analysis system 1 may extract words which frequently appear in documents which share a common classification code assigned by the user. Then, the document analysis system may analyze types of the extracted words included in each document, the evaluation value of each word, and tendency information about the number of appearances with respect to each document and assign the common classification code to a document(s) having the same tendency as the analyzed tendency information from among documents which have not accepted any classification code from the classification code accepting/assigning unit 131.

The "tendency information" is information which each document has, which indicates the degree of similarity to a document with the classification code assigned thereto, and which represents the relevance with a specified classification code based on the types of words included in each document, the number of appearances, and the evaluation values of the words. For example, when each document is similar to a document, to which a specified classification code is assigned, with respect to the relevance with the specified classification code, these two documents are recognized as having the same tendency information. Furthermore, even if the types of words included are different, documents including a word of the same evaluation value at the same number of appearances may be recognized as documents having the same tendency.

[Processing Executed by Document Analysis System 1]

Figure 2:
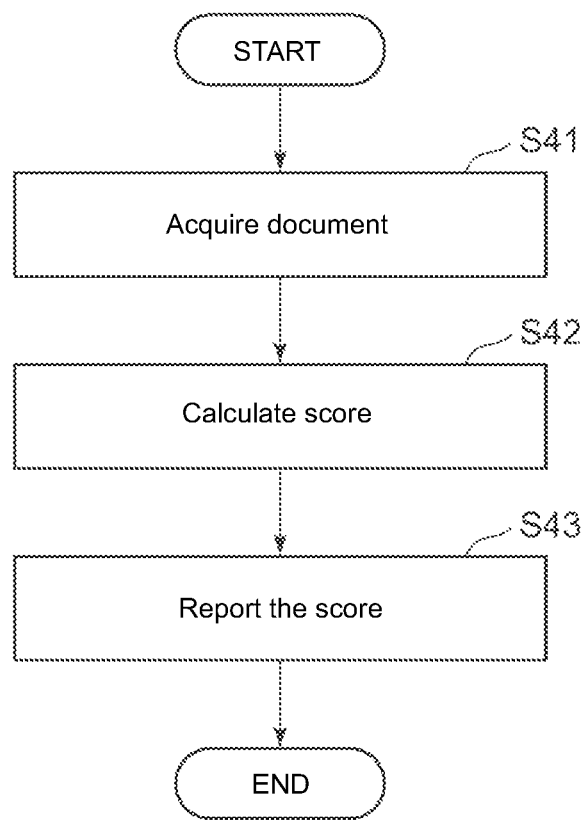
FIG. 2 is a flowchart illustrating an example of processing executed by the above-mentioned document analysis system (a document analysis method according to an embodiment of the present invention)

FIG. 2 illustrates an example of processing executed by the document analysis system 1 (a document analysis method according to an embodiment of the present invention). Incidentally, "XXX step" in parentheses in the following explanation represents each step included in the above-mentioned document analysis method (a method for controlling the document analysis system 1).

Firstly, the document extracting unit 112 acquires document information and extracts documents from the document information (step 41; "step" will be hereinafter abbreviated as "S"). Next, the score calculation unit 116 calculates the score indicative of strength of linkage between a document included in the document information and a classification code indicative of the relevance between the relevant document information and a lawsuit or fraud investigation (S42; score calculation step). Subsequently, the score report unit 701 reports that score to the user according to the score calculated by the score calculation unit 116 (S43; score report step).

[Details of Processing Executed by Document Analysis System 1]

Figure 3:
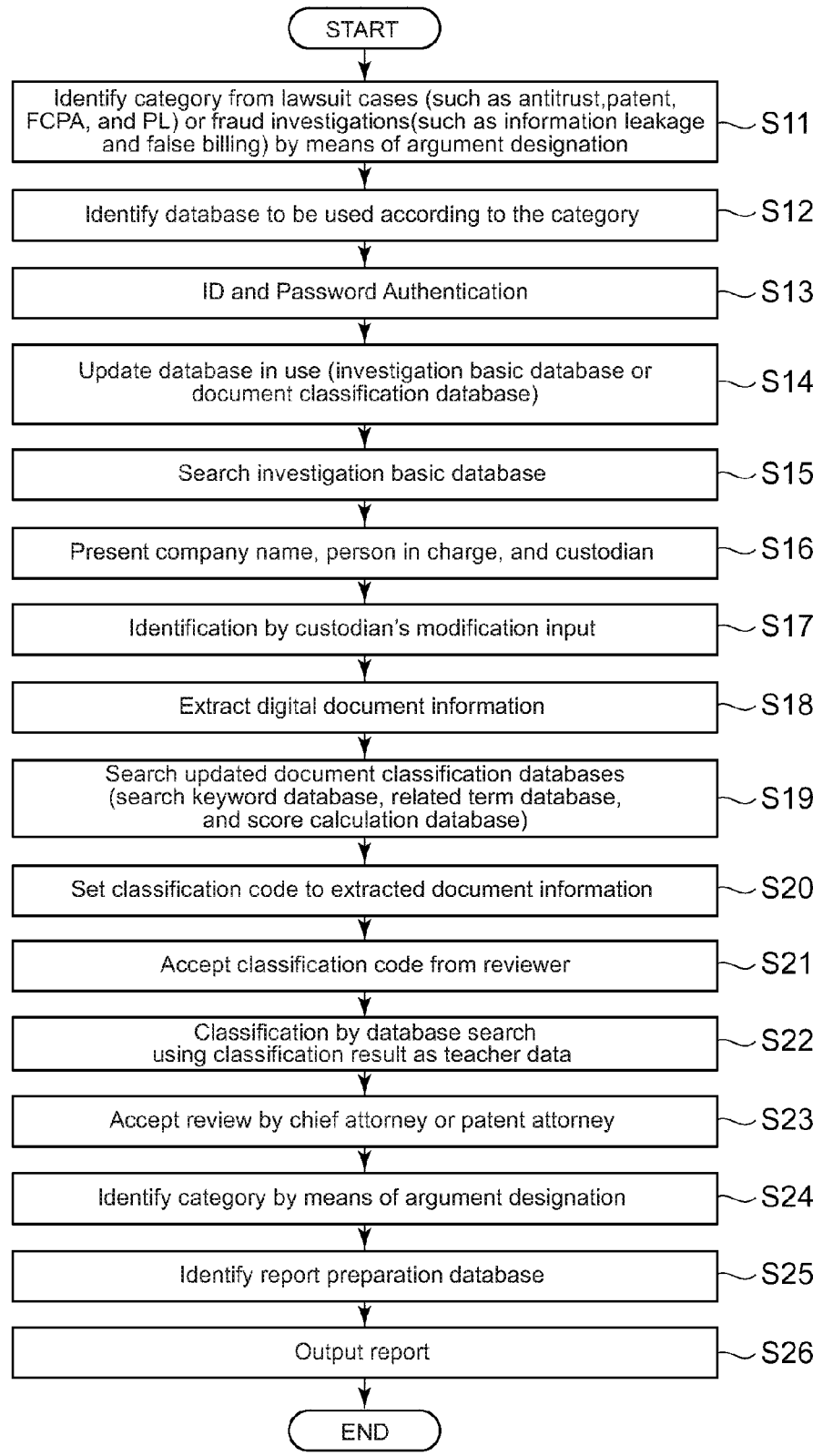
FIG. 3 is a chart illustrating a processing flow of the document analysis method according to the embodiment of the present invention.

FIG. 3 is a detailed flowchart illustrating the document analysis method according to the embodiment of the present invention. Incidentally, the flow illustrated in FIG. 2 may be executed as processing independent from the flow illustrated in FIG. 3 or as processing included at an arbitrary position of the flow illustrated in FIG. 3.

After an argument is designated by the user in accordance with display of a display screen of the display unit, a corresponding category can be identified from among, for example, lawsuit cases including antitrust, patent, FCPA, and PL cases or fraud investigations including information leakage and false billing (S11).

A database to be used such as the investigation basic database and the document analysis database can be identified according to the identified category (S12).

In order to check whether the database to be used is the latest one or not, it is possible to access an information storage apparatus which stores the latest databases. The information storage apparatus may be installed inside an organization which performs classification, or may be installed outside the organization. Regarding the case where the information storage apparatus is installed outside the organization, for example, the information storage apparatus may be installed at a law firm or patent office which cooperates with the organization.

When access is made to the information storage apparatus, ID and password authentication can be performed in order to maintain security (S13).

After the authentication is performed, a permission is granted to access the information storage apparatus, so that the database to be used such as the investigation basic database and the document analysis database can be updated to the latest database (S14).

The updated investigation basic database is searched (S15), so that a company name and names of a person in charge and a custodian can be displayed on the screen of the display device (S16).

If the names of the person in charge and the custodian, which are displayed on the screen of the display device are different from names of an actual person in charge and an actual custodian, the user correct the names of the person in charge and the custodian. After accepting the user's correction input, the document analysis apparatus can identify the names of the actual person in charge and the actual custodian (S17).

Next, digital document information can be extracted in order to carry out the document analysis work (S18).

The updated keyword database, related term database, and score calculation database are searched as the updated document analysis database (S19), so that the classification code can be assigned to the extracted document information (S20).

Furthermore, after accepting the classification code from the reviewer, the classification code can be assigned to the extracted document information (S21).

The classification code can be assigned to the extracted document information by searching the database by using the classification result as teacher data (S22).

The chief attorney's or patent attorney's review can be accepted (S23). Accordingly, the quality of the investigation can be enhanced.

A category can be identified by the user's argument designation (S24) and a report preparation database can be identified according to the identified category (S25). A report format can be determined according to the identified report preparation database and the report can be automatically output (S26).

Figure 4:
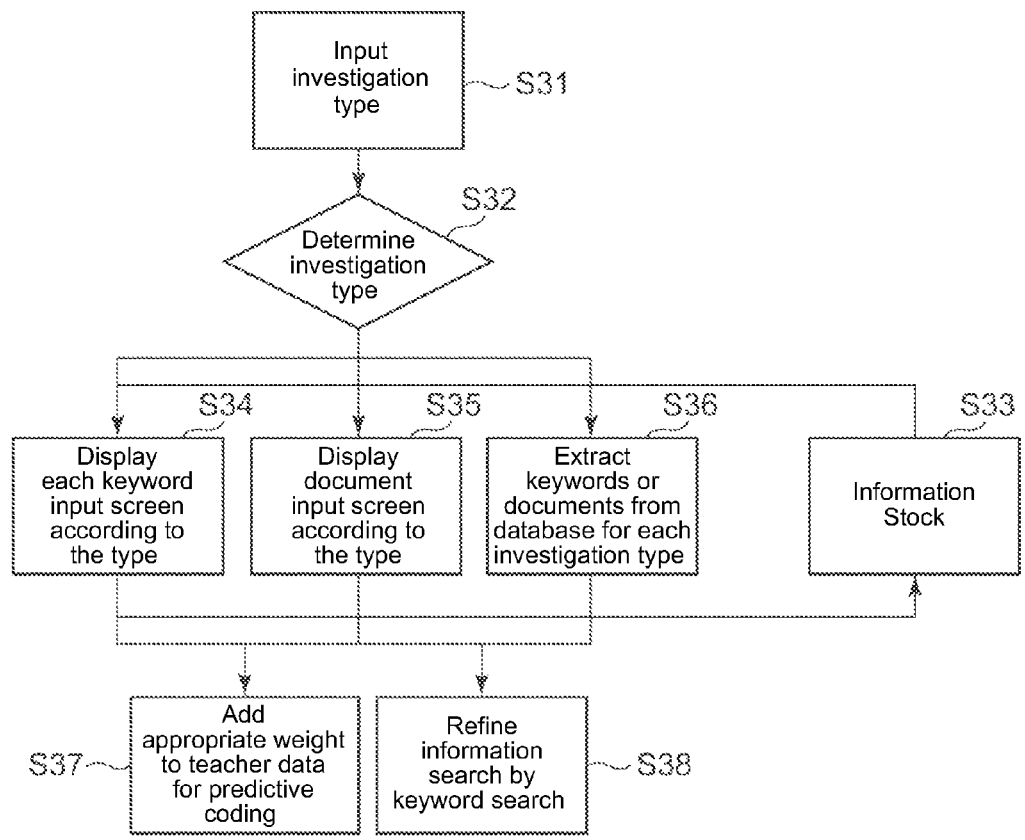
FIG. 4 is a chart illustrating a flow of investigation and classification processing according to an investigation type by the document analysis method according to the embodiment of the present invention.

FIG. 4 is a chart illustrating a flow of investigation and classification processing according to an investigation type by the document analysis method according to the embodiment of the present invention.

Firstly, the investigation type can be input (S31). Specifically speaking, the user inputs the category corresponding to the investigation and classification work to be performed, from among, for example, lawsuit cases including antitrust, patent, Foreign Corrupt Practices Act (FCPA), and Products Liability (PL) cases or fraud investigations including information leakage and false billing, according to the display on the display screen. After accepting the user's category input, the document analysis system can identify the category which is an investigation object.

The type of the investigation and document analysis processing and the type of the database to be used can be determined according to the identified category (S32).

Stock of information stored in the database to be used such as the investigation basic database and the document analysis database may be accessed according to the identified category (S33).

Each keyword input screen according to the identified category can be displayed by accessing the investigation basic database according to the identified category (S34).

Each text input screen according to the identified category can be displayed by accessing the investigation basic database according to the identified category (S35).

Keywords or documents can be extracted according to the identified category by accessing the investigation basic database according to the identified category (S36).

As a result of the above-described processing, weighting can be added to the teacher data to which the classification code is automatically assigned (predictive coding) (S37).

Refine search of the extracted documents and information can be conducted by performing the keyword search of the document analysis database (S38).

Figure 5:
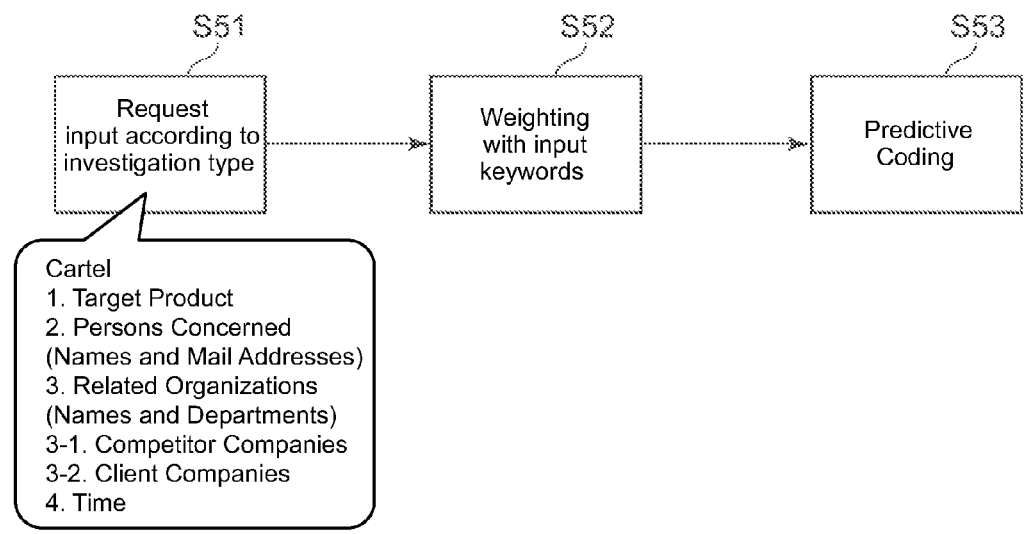
FIG. 5 is a chart illustrating a flow of predictive coding according to the investigation type by the document analysis method according to the embodiment of the present invention.

FIG. 5 is a chart illustrating a flow of the predictive coding according to the investigation type by the document analysis method according to the embodiment of the present invention.

By the document analysis method according to the embodiment of the present invention, the document analysis system can firstly request the user's input according to the investigation type and accept the user's input in response to the above request. For example, the document analysis system can request the user's input and accept the user's input in response to the above request with respect to a target product, persons concerned (names and mail addresses), related organizations (names and departments), and time. In addition, regarding the related organizations, the document analysis system can request the user's input and accept the user's input in response to the above request with respect to competitor companies and client companies (S51).

Next, weighting can be performed in response to assignment of the classification code by using the input keywords (S52). Then, predictive coding can be performed (S53).

Figure 6:
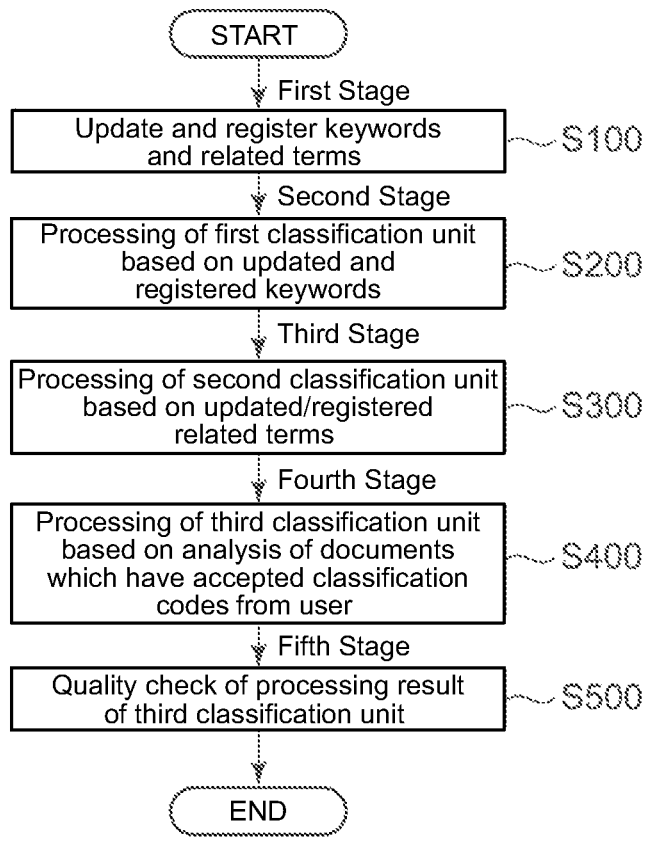
FIG. 6 is a chart illustrating a processing flow of each stage of the embodiment.

According to the embodiment of the present invention, registration processing, classification processing, and examination processing are executed in a first stage to a fifth stage according to a flowchart illustrated in FIG. 6 as an example.

In the first stage, update registration of keywords and related terms is performed in advance by using the results of the classification processing in the past (STEP 100). When this happens, the keywords and the related terms are updated and registered together with the classification code and the keyword-corresponding information and the related-term-corresponding information which are corresponding information of the keywords or the related terms.

In the second stage, documents including the keywords updated and registered in the first stage are extracted from all pieces of document information; and when such documents are found, first classification processing is executed to refer to the updated keyword-corresponding information recorded in the first stage and assign the classification code corresponding to the keywords (STEP 200).

In the third stage, documents including the related terms updated and registered in the first stage are extracted from the document information to which no classification code was assigned in the second stage, and a score of the documents including the relevant related terms is calculated. Second classification processing is executed to refer to the calculated score and the related-term-corresponding information updated and registered in the first stage and assign the classification code (STEP 300).

In the fourth stage, the classification code assigned by the user is accepted with respect to the document information to which no classification code was assigned before or in the third stage, and the classification code accepted from the user is assigned to such document information. Next, third classification processing is executed to analyze the document information to which the classification code accepted from the user is assigned, extract documents, to which no classification code is assigned, on the basis of the analysis results, and assign the classification code to the extracted documents. For example, words which appear frequently in documents which share a common classification code assigned by the relevant user are extracted; the type of the extracted words included in each document, the valuation value of each word, and the tendency information about the number of appearances are analyzed with respect to each document, and the common classification code is assigned to documents having the same tendency as that of the relevant tendency information (STEP 400).

In the fifth stage, a classification code to be assigned to the documents, to which the user assigned the classification code in the fourth stage, is determined on the basis of the analyzed tendency information and the determined classification code is compared with the classification code assigned by the user, thereby verifying the validity of the classification processing (STEP 500). Furthermore, learning processing may be executed as necessary on the basis of the results of the document analysis processing.

The tendency information used for the processing of the fourth stage and the fifth stage is information which each document has, which is indicative of the degree of similarity with a document with the classification code assigned thereto, and which is based on the type of words contained in each document, the number of appearances, and evaluation values of the words. For example, when each document is similar to a document to which a specified classification code is assigned, with respect to the relevance with the specified classification code, these two documents are recognized as having the same tendency information.

Furthermore, even if the types of words included in the documents are different, the documents which include words of the same evaluation value and of the same number of appearances may be recognized as having the same tendency.

Detailed processing flows of the respective stages from the first stage to the fifth stage will be explained below.

<First Stage (STEP 100)>

Figure 7:
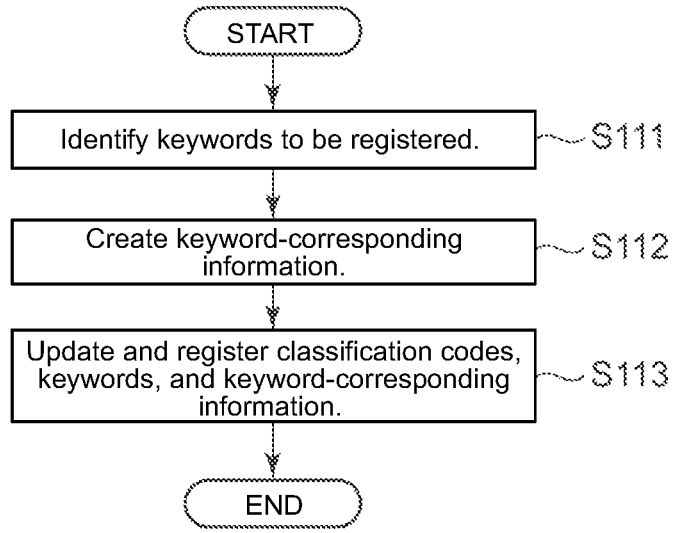
FIG. 7 is a chart illustrating a processing flow of a keyword database according to the embodiment.

A detailed processing flow of the keyword database 104 in the first stage will be explained by using FIG. 7.

The keyword database 104 creates a management table for each classification code and identifies keywords corresponding to each classification code in light of document classification results in lawsuits in the past (STEP 111). This identification is performed according to the embodiment of the present invention by analyzing the documents to which each classification code is assigned, and using the number of appearances and the evaluation value of each keyword in the relevant documents; however, for example, a method of using a transmitted information amount which the keywords have, or a method of manual selection by the user may also be used.

According to the embodiment of the present invention, for example, when keywords "infringement" and "patent attorney" are identified as keywords for a classification code "important," keyword-corresponding information indicating that the "infringement" and the "patent attorney" are the keywords having a close relation with the classification code "important" is created (STEP 112). Then, the identified keywords are registered in the keyword database 104. When this happens, the identified keywords are associated with the keyword-corresponding information and recorded in a management table for the classification code "important" in the keyword database 104 (STEP 113).

Figure 8:
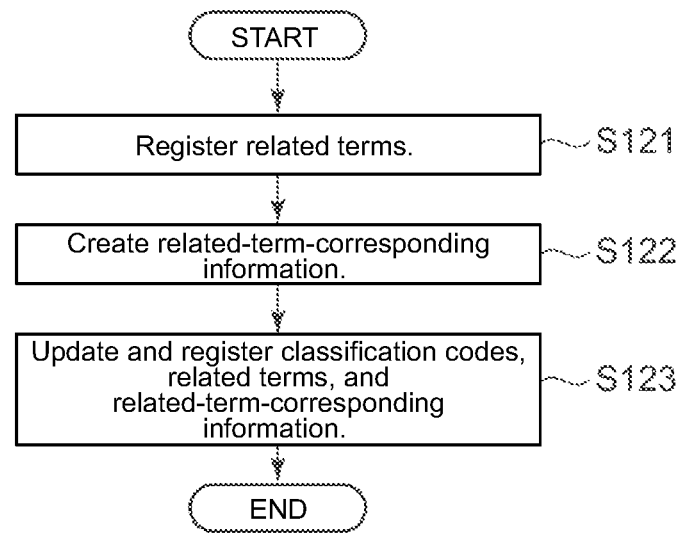
FIG. 8 is a chart illustrating a processing flow of a related term database according to this embodiment.

Next, a detailed processing flow of the related term database 105 will be explained with reference to FIG. 8. The related term database 105 creates a management table for each classification code in light of document classification results in lawsuits in the past and registers related terms corresponding to each classification code (STEP 121). In the embodiment of the present invention, for example, "coding processing" and "Product a" are registered as related terms of "Product A" and "decoding" and "Product b" are registered as related terms of "Product B."

The related-term-corresponding information indicating to which classification code each of the registered related terms corresponds is created (STEP 122) and is recorded in each management table (STEP 123). When this happens, a threshold value which is a score required to determine the evaluation value of each related term and classification code is also recorded in the related-term-corresponding information.

Before actually conducting classification work, the keywords and the keyword-corresponding information as well as the related terms and the related-term-corresponding information are updated to the latest data and registered (STEP 113 and STEP 123).

<Second Stage (STEP 200)>

Figure 9:
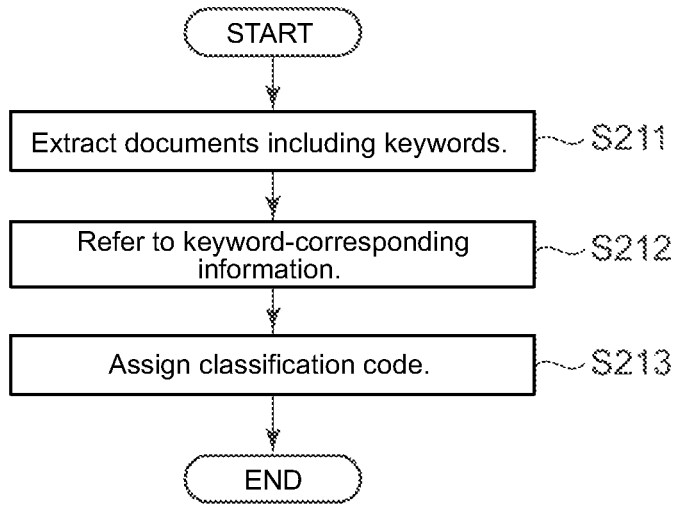
FIG. 9 is a chart illustrating a processing flow of a first automatic classification unit according to this embodiment.

A detailed processing flow of the first automatic classification unit 201 in the second stage will be explained with reference to FIG. 9. In the second stage in the embodiment of the present invention, the first automatic classification unit 201 executes processing for assigning the classification code "important" to documents.

The first automatic classification unit 201 extracts the documents including the keywords "infringement" and "patent lawyer," which were registered in the keyword database 104 in the first stage (STEP 100), from the document information (STEP 211). The first automatic classification unit 201 refers to the management table, in which the relevant keywords are recorded, based on the keyword-corresponding information (STEP 212) and assigns the classification code "important" to the extracted documents (STEP 213).

<Third Stage (STEP 300)>

Figure 10:
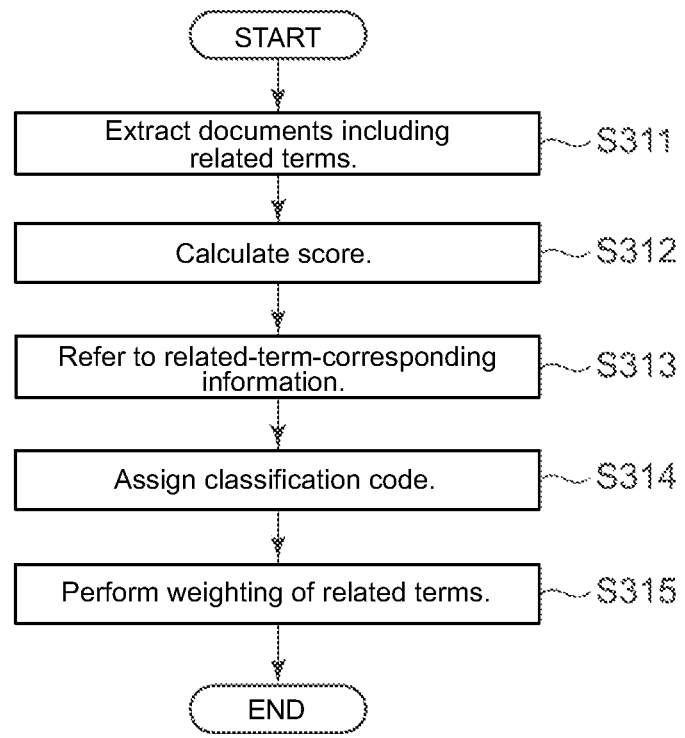
FIG. 10 is a chart illustrating a processing flow of a second automatic classification unit according to this embodiment.

A detailed processing flow of the second automatic classification unit 301 in the third stage will be explained with reference to FIG. 10.

In the embodiment of the present invention, the second automatic classification unit 301 executes processing for assigning classification codes "Product A" and "Product B" to the document information to which no classification code was assigned in the second stage (STEP 200).

The second automatic classification unit 301 extracts documents including the related terms "coding processing," "Product a," "decoding," and "Product b," which were recorded in the related term database 105 in the first stage, from the relevant document information (STEP 311). The score calculation unit 116 calculates a score based on the appearance frequency and evaluation values of the recorded four related terms with respect to the extracted documents by using Expression (1) (STEP 312). The score represents the relevance between each document and the classification codes "Product A" and "Product B."

When the score exceeds the threshold value, the second automatic classification unit 301 refers to the related-term-corresponding information (STEP 313) and assigns an appropriate classification code (STEP 314).

For example, if in a certain document the appearance frequency of the related terms "coding processing" and "Product a" and the evaluation value of the related term "coding processing" are high and the score indicative of the relevance with the classification code "Product A" exceeds the threshold value, the classification code "Product A" is assigned to the relevant document.

When this happens, if the appearance frequency of the related term "Product b" in the relevant document is also high and the score indicative of the relevance with the classification code "Product B" exceeds the threshold value, "Product B" is also assigned, together with the classification code "Product A," to the relevant document. On the other hand, if the appearance frequency of the related term "Product b" in the relevant document is low and the score indicative of the relevance with the classification code "Product B" does not exceed the threshold value, only the classification code "Product A" is assigned to the relevant document.

The second automatic classification unit 301 recalculates the evaluation value of the related term according to Expression (2) indicated below by using the score calculated in STEP 432 of the fourth stage and weights the evaluation value (STEP 315).

[Math. 2]

$$\text{wgt}_{i,L} = \sqrt{\text{wgt}_{L-i}^2 + \gamma_L \text{wgt}_{i,L}^2 - \theta} = \sqrt{\text{wgt}_{i,L}^2 + \Sigma_{l=1}^{L}(\gamma_l \text{wgt}_{i,L}^2 - \theta)} \quad (2)$$

$\text{wgt}_{i,0}$: weight (initial value) of i-th selected keyword before learning
$\text{wgt}_{i,L}$: weight of i-th selected keyword after L-th learning
$\gamma_L$: learning parameter for L-th learning
$\theta$: threshold value of learning effect For example, if there are a certain number or more of documents regarding which the appearance frequency of "decoding" is very high, but the score is lower than a certain value, the evaluation value of the related term "decoding" is decreased and then recorded in the related-term-corresponding information again.

<Fourth Stage (STEP 400)>

Figure 11:
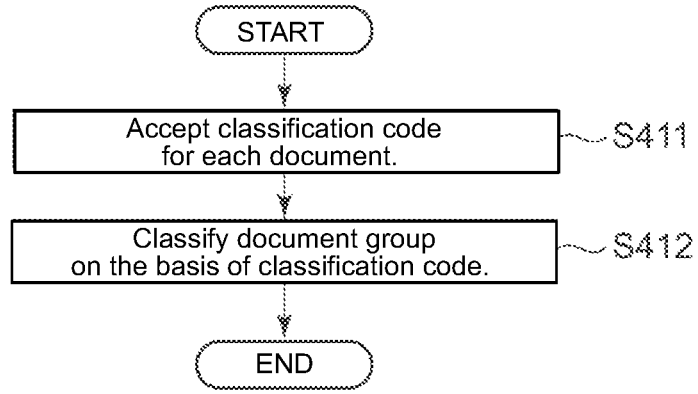
FIG. 11 is a chart illustrating a processing flow of a classification code accepting/assigning unit according to this embodiment.

In the fourth stage as illustrated in FIG. 11, assignment of the classification codes from the reviewer is accepted with respect to a certain proportion of document information extracted from the document information to which no classification code was assigned before or in the third stage; and the accepted classification codes are assigned to the relevant document information. Next, referring to FIG. 12, the document information to which the classification codes accepted from the reviewer is analyzed and the classification codes are assigned to the document information, to which no classification code is assigned, on the basis of the analysis result. Incidentally, in the embodiment of the present invention, processing for assigning, for example, the classification codes "important," "Product A," and "Product B" to the relevant document information is executed in the fourth stage. The fourth stage will be further explained below.

A detailed processing flow of the classification code accepting/assigning unit 131 in the fourth stage will be explained with reference to FIG. 11. The document extracting unit 112 firstly randomly samples documents from the document information, which is a processing target in the fourth stage, and displays them on the document display unit 130. In the embodiment of the present invention, documents which are 20% of the processing-target document information are randomly extracted and become targets to be classified by the reviewer. Sampling may be conducted by an extraction method of arranging the documents in the order of document creation dates and times or in the order of their names and selecting top 30% documents.

Figure 17:
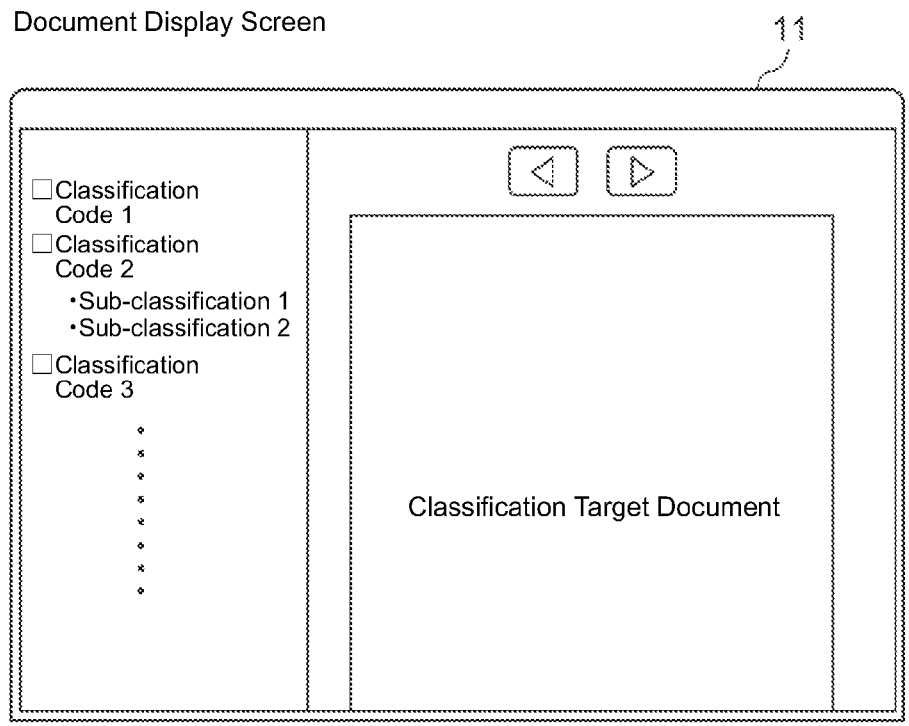
FIG. 17 is a document display screen according to this embodiment.

The user browses the document display screen 11 displayed on the document display unit 130 as illustrated in FIG. 17 and selects a classification code to be assigned to each document. The classification code accepting/assigning unit 131 accepts the classification code selected by the user (STEP 411) and performs classification on the basis of the assigned classification code (STEP 412).

Figure 12:
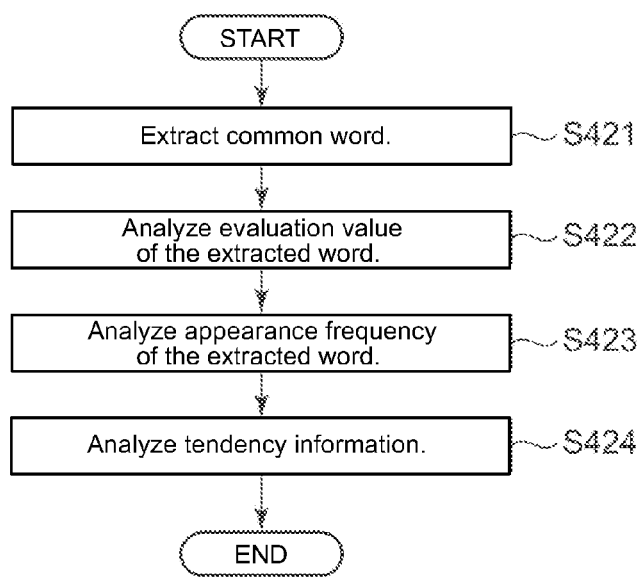
FIG. 12 is a chart illustrating a processing flow of a document analysis unit according to this embodiment.

Next, a detailed processing flow of the document analysis unit 118 will be explained with reference to FIG. 12. The document analysis unit 118 extracts a word(s) which frequently appears commonly in the documents classified by each classification code by the classification code accepting/assigning unit 131 (STEP 421). The evaluation value of the extracted common word is analyzed according to Expression (2) (STEP 422) and the appearance frequency of the common word in the documents is analyzed (STEP 423).

Furthermore, based on the analysis result in STEP 422 and STEP 423, the tendency information of the documents to which the classification code "important" is assigned is analyzed (STEP 424).

Figure 13:
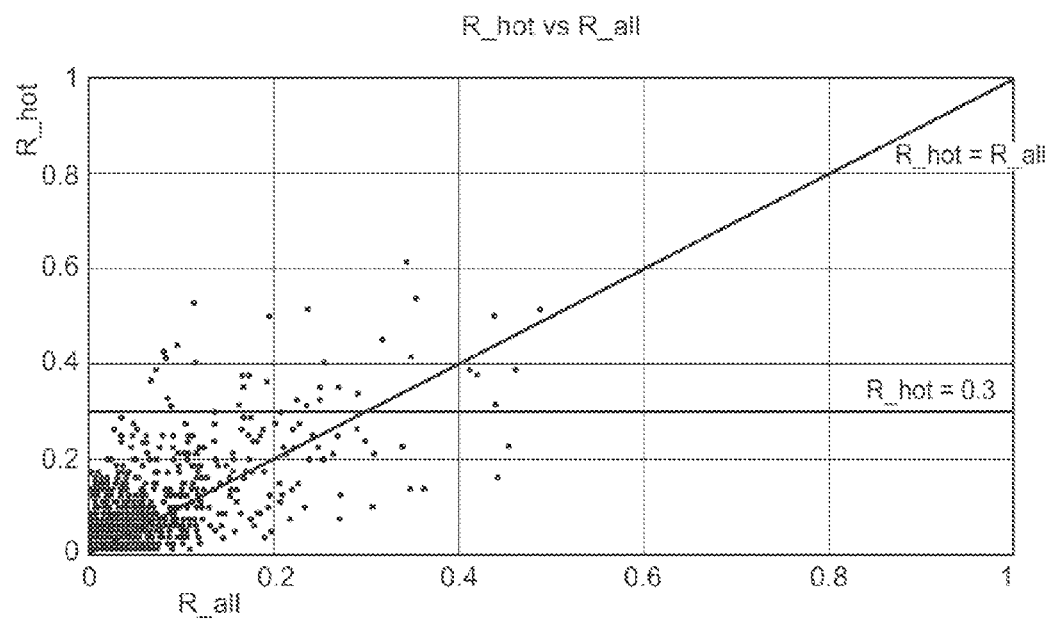
FIG. 13 is a graph illustrating an analysis result of a document analysis unit according to this embodiment.

FIG. 13 is a graph illustrating the analysis result of words which frequently appear commonly in the documents, to which the classification code "important" is assigned, in STEP 424.

Referring to FIG. 13, the vertical axis R_hot represents a proportion of documents which include words selected as words linked to the classification code "important" and to which the classification code "important" is assigned, to all the documents to which the classification code "important" assigned by the user. The horizontal axis represents a proportion of documents including the words extracted by the classification code accepting/assigning unit 131 from among all the documents, on which the user has executed the classification processing, in STEP 421.

In the embodiment of the present invention, the classification code accepting/assigning unit 131 extracts words like those plotted above a straight line R_hot=R_all as common words for the classification code "important."

The processing in STEP 421 to STEP 424 is also executed on documents to which the classification codes "Product A" and "Product B" are assigned; and the tendency information of the relevant documents is analyzed.

Figure 14:
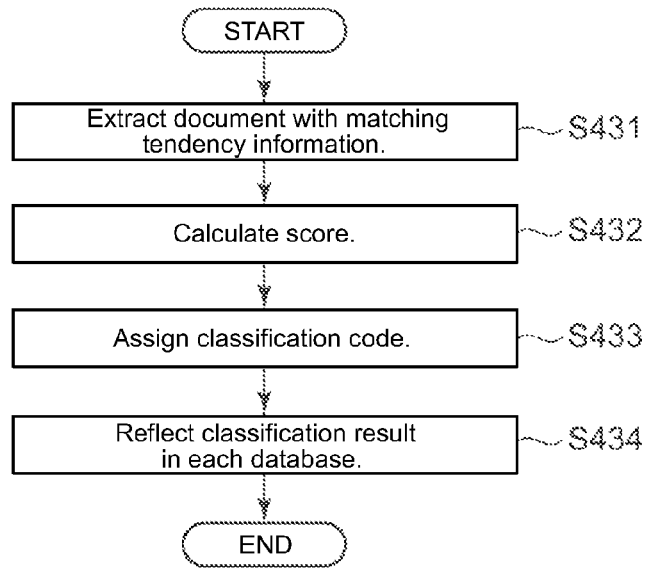
FIG. 14 is a chart illustrating a processing flow of a third automatic classification unit according to one example of this embodiment.

Next, a detailed processing flow of the third automatic classification unit 401 will be explained with reference to FIG. 14. The third automatic classification unit 401 executes processing on documents, to which the assignment of classification codes was not accepted by the classification code accepting/assigning unit 131 in STEP 411, from among the document information which is the processing target in the fourth stage. The third automatic classification unit 401 extracts documents having the same tendency information as the tendency information of the documents, to which the classification codes "important," "Product A," and "Product B" are assigned and analyzed in STEP 424, from the above-described documents (STEP 431) and calculates the score with respect to the extracted documents on the basis of the tendency information by using Expression (1) (STEP 432). Furthermore, the third automatic classification unit 401 assigns appropriate classification codes to the documents extracted in STEP 431 on the basis of the tendency information (STEP 433).

The third automatic classification unit 401 further reflects the classification result in each database by using the score calculated in STEP 432 (STEP 434). Specifically speaking, processing for decreasing the evaluation values of the keywords and the related terms included in documents with a low score, and increasing the evaluation values of the keywords and the related terms included in documents with a high score may be executed.

Figure 15:
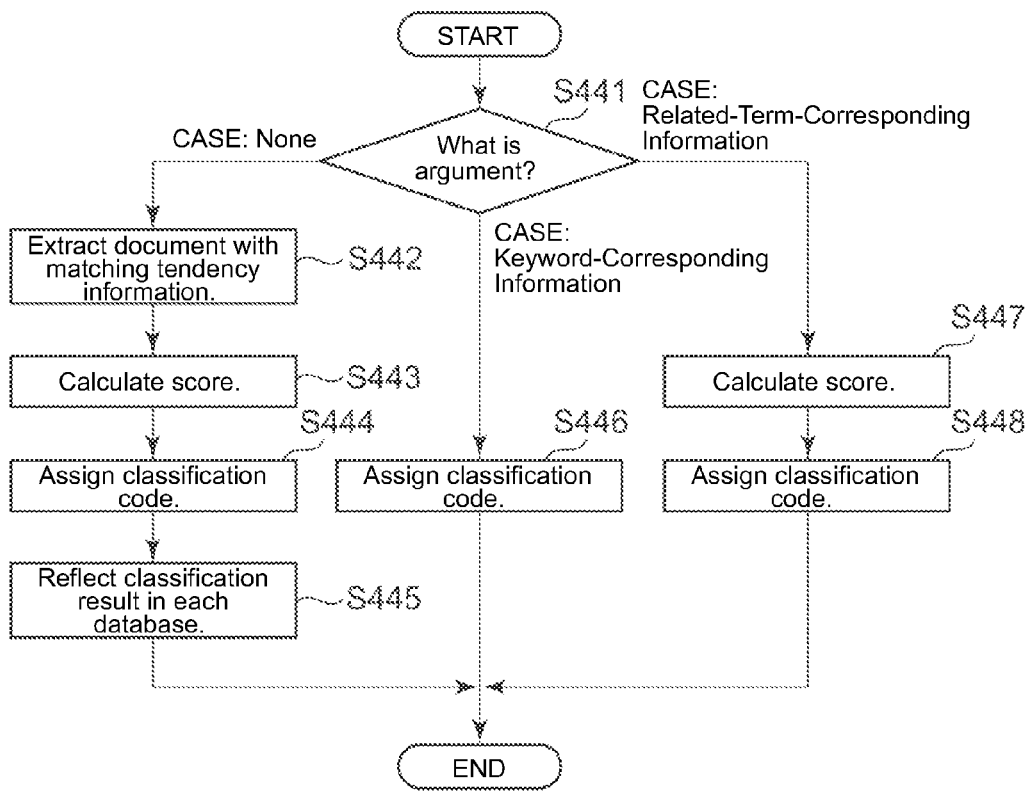
FIG. 15 is a chart illustrating a processing flow of the third automatic classification unit according to another example of this embodiment.

Furthermore, one example of a detailed processing flow of the third automatic classification unit 401 will be explained with reference to FIG. 15. The third automatic classification unit 401 may execute classification processing on documents, regarding which the assignment of classification codes was not accepted by the classification code accepting/assigning unit 131 in STEP 411, from among the document information which is the processing target in the fourth stage. When an argument is not given (STEP 441: None), the third automatic classification unit 401 extracts documents having the same tendency information as the tendency information of the documents, to which the classification code "important" is assigned and which were analyzed in STEP 424, from the relevant documents (STEP 442) and calculates the score with respect to the extracted documents on the basis of the tendency information by using Expression (1) (STEP 443). Furthermore, the third automatic classification unit 401 assigns appropriate classification codes to the documents extracted in STEP 442 on the basis of the tendency information (STEP 444).

The third automatic classification unit 401 further reflects the classification result in each database by using the score calculated in STEP 443 (STEP 445). Specifically speaking, the third automatic classification unit 401 executes processing for decreasing the evaluation values of the keywords and the related terms included in documents with a low score, and increasing the evaluation values of the keywords and the related terms included in documents with a high score.

The score calculation is performed by both the second automatic classification unit 301 and the third automatic classification unit 401 as described above; and when the number of times of the score calculation is high, data for the score calculation may be collectively stored in the score calculation database 106.

<Fifth Stage (STEP 500)>

Figure 16:
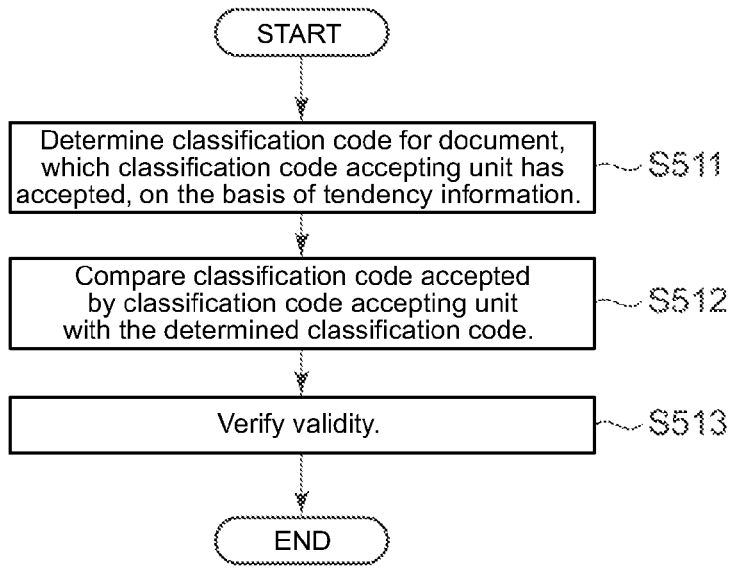
FIG. 16 is a chart illustrating a processing flow of a quality checking unit according to this embodiment.

A detailed processing flow of the quality checking unit 501 in the fifth stage will be explained with reference to FIG. 16. The quality checking unit 501 determines a classification code to be assigned to the documents accepted by the classification code accepting/assigning unit 131 in STEP 411 on the basis of the tendency information analyzed by the document analysis unit 118 in STEP 424 (STEP 511).

The quality checking unit 501 compares the classification code accepted by the classification code accepting/assigning unit 131 with the classification code determined in STEP 511 (STEP 512) and verifies the validity of the classification code accepted in STEP 411 (STEP 513).

The document analysis system 1 according to the embodiment of the present invention may be equipped with the learning unit 601. The learning unit 601 learns weighting of each keyword or related term according to Expression (2) on the basis of the first to fourth processing results. The learning result may be reflected in the keyword database 104, the related term database 105, or the score calculation database 106.

The document analysis system according to the embodiment of the present invention can be equipped with the report preparation unit 701 that outputs an optimum investigation report according to the investigation type of the relevant lawsuit case (such as, in a case of lawsuits, cartel, patent, FCPA, and PL lawsuits) or the fraud investigation (such as information leakage or billing fraud) on the basis of the result of the document analysis processing.

The investigation content varies depending on the investigation type.

For example, in a cartel case, key points will be as described below.

1. When and how persons in charge of competitors communicated with each other in relation to the cartel (for adjustment of prices); and 2. who in which organizations are the persons concerned.

Furthermore, in a case of patent infringement, key points will be:

1. whether or not its content is the same as a technique that is an infringement object; and 2. who made, or did not make, the infringement and when, and with (or without) what intention the infringement was made.

[Advantageous Effects of Document Analysis System 1]

The document analysis system 1 can calculate the score indicative of strength of linkage between a document(s) included in the document information and the classification code indicating the relevance between the document information and a lawsuit or fraud investigation, and report that score to the user. Specifically speaking, the document analysis system 1 can quantify the priorities of documents to be monitored and feed them back to the user, so that it has the advantageous effect capable of promoting the efficiency in monitoring the documents.

Other Embodiments

Other examples of the embodiment of the present invention will be described below. In another example of the embodiment of the present invention, a method of analyzing documents, to which classification codes have already been assigned, according to similar search information and adjusting the range to assign the classification codes on the basis of the analysis result is used.

As the method of adjusting the range to assign the classification codes according to the similar search information, there are a method of adjusting the range to assign the classification codes by clustering the similar search information according to the similar search information, and a method of performing predictive classification by learning the classification result. Regarding the method of adjusting the range to assign the classification codes by clustering the similar search information according to the similar search information, there is a case, for example, in which attention is focused on commonality of metadata and a common classification code is assigned to an original document, a response document of the original document, and a response document of the response document of the original document. Regarding the method of performing the predictive classification by learning the classification result, the same or similar classification code is assigned with respect to the similar search information by learning the classification result so as to integrate the similar search information.

In another example of the embodiment of the present invention, reliability of the analysis result changes depending on the number of documents which become analysis objects. At which time and to which proportion of all the documents the range to assign the classification codes should be adjusted on the basis of the analysis result may be determined by applying a statistic means to the total number of documents which become objects to be classified.

In another example of the embodiment of the present invention, as the method of adjusting the range to assign the classification codes according to the similar search information, the range of documents to assign the classification codes may be adjusted by executing both the method of adjusting the range to assign the classification codes by clustering the search information according to the similar search information and the method of performing the predictive classification by learning the classification result. As a result, in the other examples of the embodiment of the present invention, it is possible to assign the classification codes promptly and precisely and reduce the burdens caused by the classification work.

[Supplementary Description]

A control block of the document analysis system 1 may be implemented by a logical circuit (hardware) formed on, for example, an integrated circuit (IC chip) or may be implemented by software by using the CPU (Central Processing Unit). In the latter case, the document analysis system 1 includes, for example, a CPU for executing commands of a program which is software for implementing each function (a control program); a ROM (Read Only Memory) or a storage device (collectively referred to as the "storage media") in which the above-mentioned program and various kinds of data are recorded in a manner such that they can be read by the computer (or CPU); and a RAM (Random Access Memory) for expanding the above-mentioned program. Then, the object of this invention is achieved by the computer (or CPU) reading the above-mentioned program from the above-mentioned storage media and executing it. As the above-mentioned storage media, "tangible media which are not temporary" such as tapes, disks, cards, semiconductor memories, or programmable logical circuits can be used. Furthermore, the above-mentioned program may be supplied to the above-mentioned computer via an arbitrary transmission medium capable of transmitting the relevant program (such as a communication network or a broadcast wave). This invention can also be implemented in a form of a data signal embedded in a carrier wave in which the above-mentioned program is embodied via electronic transmission.

The present invention is not limited to each of the aforementioned embodiments and can be changed in various ways within the scope of claims and an embodiment obtained by combining the technical means disclosed respectively in the different embodiments is also included in the technical scope of the present invention. Furthermore, a new technical feature can be formed by combining the technical means disclosed respectively in the respective embodiments.

A document analysis system acquires digital information recorded in a plurality of computers or servers, analyzes document information composed of a plurality of documents included in the acquired digital information, and facilitates the use of the document information in a lawsuit or fraud investigation; wherein the document analysis system includes: an investigation basic database that stores information related to the lawsuit or fraud investigation; an investigation category input accepting unit that accepts input of a category of the lawsuit or fraud investigation; and an investigation type determining unit that determines an investigation category of an investigation object on the basis of the category accepted by the investigation category input accepting unit and extracts a type of necessary information from the investigation basic database.

The above-mentioned document analysis system further includes a display screen controlling unit that controls a display screen which presents the type of the information extracted by the investigation type determining unit to the user.

The above-mentioned document analysis system further includes an input accepting unit that accepts the user's input of a keyword and/or text corresponding to the type of the information presented to the display screen controlling unit.

The above-mentioned document analysis system further includes an information extraction unit that extracts the keyword and/or text corresponding to the type of the information extracted by the investigation type determining unit from the investigation basic database.

The above-mentioned document analysis system further includes a searching unit that searches the documents for the keyword and/or text.

The above-mentioned document analysis system further includes an automatic classification code assigning unit that automatically assigns a classification code to the documents, and the keyword and/or text is used to assign the classification code.

A document analysis method acquires digital information recorded in a plurality of computers or servers, analyzes document information composed of a plurality of documents included in the acquired digital information, and facilitates the use of the document information in a lawsuit or fraud investigation; wherein the document analysis method includes: an investigation category input accepting step of accepting input of a category of the lawsuit or fraud investigation; and an investigation type determining step of determining an investigation category of an investigation object on the basis of the category accepted in the investigation category input accepting step and extracting a type of necessary information from an investigation basic database for storing information related to the lawsuit or fraud investigation.

A document analysis program acquires digital information recorded in a plurality of computers or servers, analyzes document information composed of a plurality of documents included in the acquired digital information, and facilitates the use of the document information in a lawsuit or fraud investigation; wherein the document analysis program causes a computer to implement: an investigation category input accepting function that accepts input of a category of the lawsuit or fraud investigation; and an investigation type determining function that determines an investigation category of an investigation object on the basis of the category accepted by the investigation category input accepting function and extracts a type of necessary information from an investigation basic database for storing information related to the lawsuit or fraud investigation.

REFERENCE SIGNS LIST 1 document analysis system
201 first automatic classification unit
301 second automatic classification unit
401 third automatic classification unit
501 quality checking unit
601 learning unit
701 score report unit
100 data storage unit
101 digital information storage area
103 investigation basic database
104 keyword database
105 related term database
106 score calculation database
107 report preparation database
109 database management unit
112 document extracting unit
114 word searching unit
116 score calculation unit
118 document analysis unit
120 language determination unit
122 translation unit
124 tendency information generation unit
130 document display unit
131 classification code accepting/assigning unit
133 lawyer's review accepting unit
11 document display screen

The invention claimed is:

1. A computer implemented e-mail analysis system comprising:
   a keyword database that retains a plurality of keywords, each of the keywords having a correspondence with one or more classification codes, the classification codes being used to classify one or more e-mails;
   a processor; and
   a memory, wherein the memory has stored thereon instructions that, when executed by the processor, causes the processor to:
   search one of the keywords in a first e-mail and assign a first classification code corresponding to the keyword;
   accept a second classification code assigned by a user for a second e-mail to which no classification code has been assigned;
   calculate a score, which indicates strength of linkage between the first e-mail and the first classification code as well as between the second e-mail and the second classification code, and quantifies priority of the e-mails to be monitored, on the basis of a plurality of terms that respectively appear in the first e-mail and the second e-mail to which the one or more classification codes have been assigned and an evaluation value of each of the plurality of terms;
   learn the evaluation value of each of the plurality of terms based on a process of classifying the one or more e-mails, the learned evaluation value being used to calculate the score;
   prepare an investigation report by using the calculated score when the calculated score exceeds a specified threshold value arbitrarily set by the system on the basis of an input from the user; and
   promote efficiency in monitoring the e-mails by feeding back the score to the user by outputting the prepared investigation report.

2. The e-mail analysis system according to claim 1, wherein the memory has stored thereon further instructions that, when executed by the processor, causes the processor to:
   extract the e-mail having the score which is fed back to the user;
   the system further comprising:
   an e-mail display unit that displays the extracted e-mail on a document display screen.

3. The e-mail analysis system according to claim 1, wherein the second classification code is assigned by the user to the e-mail on the basis of a relation with a specified case.

4. The e-mail analysis system according to claim 3, wherein the memory has stored thereon further instructions that, when executed by the processor, causes the processor to:
   accept input of a category of the specified case.

5. The e-mail analysis system according to claim 1, wherein the memory has stored thereon further instructions that, when executed by the processor, causes the processor to:
   further calculate the score in a time-series manner; and
   calculate a moving average of a group of scores calculated in the time-series manner as the score indicative of the strength of linkage between the one or more e-mails and the first and the second classification codes.

6. An e-mail analysis method executed by a computer, comprising:
   referring to a keyword database retaining a plurality of keywords, each of the keywords having a correspondence with one or more classification codes, the classification codes being used to classify one or more e-mails;
   searching one of the keywords in a first e-mail and assign a first classification code corresponding to the keyword;
   accepting a second classification code assigned by a user for a second e-mail to which no classification code has been assigned;
   calculating a score, which indicates strength of linkage between the first e-mail and the first classification code as well as between the second e-mail and the second classification code, and quantifies priority of the e-mails to be monitored, on the basis of a plurality of terms that respectively appear in the first e-mail and the second e-mail to which the one or more classification codes have been assigned and an evaluation value of each of the plurality of terms;
   learning the evaluation value of each of the plurality of terms based on a process of classifying the one or more e-mails, the learned evaluation value being used to calculate the score;
   preparing an investigation report by using the calculated score when the calculated score exceeds a specified threshold value set on the basis of an input from the user; and
   promoting efficiency in monitoring the e-mails by feeding back the score to the user by outputting the prepared investigation report.

7. A non-transitory computer readable storage medium having stored thereon an e-mail analysis program for causing a computer to:
   refer to a keyword database retaining a plurality of keywords having a correspondence with one or more classification codes, the classification codes being used to classify one or more e-mails;
   search one of the keywords in a first e-mail and assign a first classification code corresponding to the keyword;
   accept a second classification code assigned by a user for a second e-mail to which no classification code has been assigned;
   calculate a score, which indicates strength of linkage between the first e-mail and the first classification code as well as between the second e-mail and the second classification code, and quantifies priority of the e-mails to be monitored, on the basis of a plurality of terms that respectively appear in the first e-mail and the second e-mail to which the one or more classification codes have been assigned and an evaluation value of each of the plurality of terms;
   prepare an investigation report by using the calculated score when the calculated score exceeds a specified threshold value arbitrarily set on the basis of an input from the user; and
   promote efficiency in monitoring the e-mails by feeding back the score to the user by outputting the prepared investigation report.

* * * * *